Feb. 8, 1927.
H. SCHNEIDER
1,616,993
VALVE MEMBER FOR TWO-STROKE CYCLE INTERNAL COMBUSTION ENGINES
Filed Jan. 3, 1924
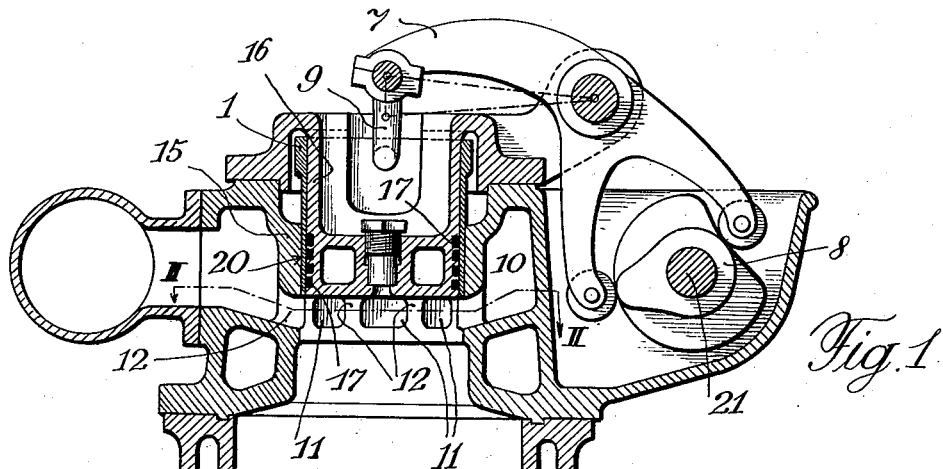
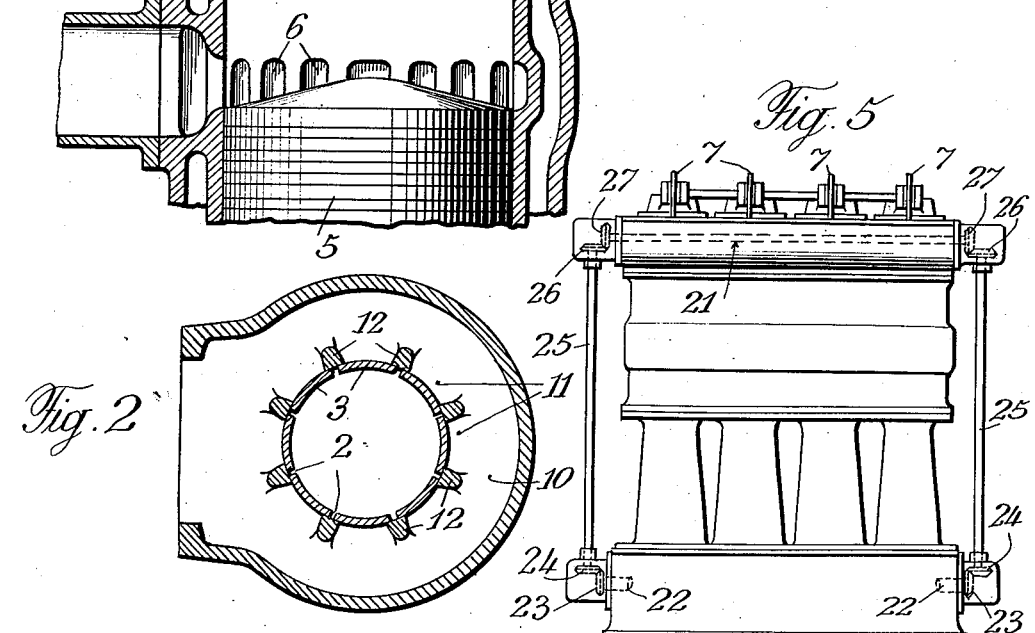
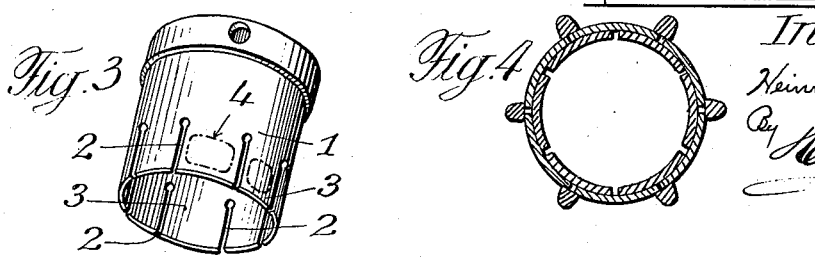
Inventor:
Heinrich Schneider, Patented Feb. 8, 1927.

1,616,993

UNITED STATES PATENT OFFICE.

HEINRICH SCHNEIDER, OF ILLNAU, SWITZERLAND.

VALVE MEMBER FOR TWO-STROKE-CYCLE INTERNAL-COMBUSTION ENGINES.

Application filed January 3, 1924, Serial No. 684,179, and in Germany January 8, 1923.

The present invention relates to a valve or controlling member for two-stroke cycle internal combustion engines, and which consists of one or more slide valves in the shape of hollow cylinders having flaps pressed against seats or tightening faces by a fluid pressure, whereas passage areas to be controlled are uncovered by a displacement of the controlling member. The present controlling member is particularly suitable for machines with which an equalization of pressure or a relief of the controlling member from the pressure occurs during the period in which it is displaced or moved and with which the member remains stationary when the pressure acts on it as is for instance the case with valve members controlling the admission of scavenging air with two-stroke cycle internal combustion engines.

Flaps similar to those of the elastic flap valves are, for instance, obtained by the provision of slots or notches on the cylindrical controlling part of the valve. The present controlling member differs from the known spring loaded flaps of flap valves inasmuch as with the former the passage area is uncovered by a displacement of the valve whereas with the flap valves this is effected by a lifting movement of the flap, the manner of effecting the tightening by the flap being pressed against a support or seat is common to both types of valves. This division in the manner of working of the valve, however, permits the adoption of very large passage areas.

A very essential feature of the controlling member according to the present invention consists in the fact that the unloaded flaps scrape clean the seat with which the member cooperates on moving downwards and that the inner side of the flaps on account of the latter being pressed in a radial direction by the pressure of the scavenging air are scraped clean by the part of the cylinder head projecting into the cylindrical controlling member. A further feature consists in the fact that the valve in its raised position is effectively cooled by the inner and outer guidance and when in motion by the scavenging air flowing past the valve. This feature permits the utilization of the valve in internal combustion engines in which high temperatures occur.

Constructional examples of the subject matter of the present invention are illustrated on the accompanying drawings, in which:

Fig. 1 is a vertical section through the upper part of a vertical internal combustion engine in which the controlling member according to the present invention is utilized, Fig. 2 is a horizontal section along line II—II of Fig. 1, Fig. 3 is a perspective view of the controlling member, Fig. 4 is a modified design of the member in a horizontal section, and Fig. 5 shows a general arrangement of the internal combustion engine, part of which is illustrated in Fig. 1.

Fig. 3 illustrates a valve 1 shaped as a hollow cylinder provided in its lower part with flaps 3 uniformly spaced around the circumference, the flaps are obtained by slotting this lower part of the valve and they are resilient in a radial direction. The flaps 3 cover, in the manner of flaps of flap valves, the ports (shown at 4 in dotted lines) the passage through which has to be controlled, the parts adjacent the edges of the flaps being pressed by an internal pressure on the rectangular seats enclosing the ports. The cylindrical valve is guided on its inner and outer side and little clearance between the valve and the guidances being provided so that the deflection of the flaps on being pressed against the seats for effecting the tightening is very small.

Fig. 4 represents a cross-section of a modified valve consisting of two cylindrical bushes one arranged inside the other and provided with flaps which are staggered. This valve presents a greater elasticity, increased tightening qualities and strength.

In Fig. 1 the upper part of the working cylinder of a two-stroke cycle internal combustion engine is shown in which a valve 1 according to the present invention serves to control the admission of the scavenging air, and Fig. 2 shows a cross-section of the valve and the admission ports.

The piston 5 is illustrated in its lowermost position, the exhaust ports are uncovered and the valve 1 is raised by means of the lever 7, double cam 8 and stirrup 9 into its uppermost position, so that scavenging air is permitted to enter into the combustion space from the annular chamber 10 through the ports 11 and to flow through the cylinder and to leave the latter by the exhaust ports 6.

The valve 1 is guided in the cylinder cover 15 and by the part 16 of the latter projecting into the interior of the valve 1 and is packed against the combustion space by means of packing rings 17. In this raised position the valve 1 is cooled by the inner and outer guidance. In the lowermost position of the valve the slots in the valve come to bear on the bridge parts 12 separating the ports 11 and the flaps are pressed tight against the cylindrical facing 20, in which the ports end, by the internal pressure.

Fig. 5 shows diagrammatically the general arrangement of a two-stroke cycle internal combustion engine. The cam shaft 21 is driven from the crank shaft 22 of the machine by means of bevel gears 23, 24, upright shaft 25 and bevel gears 26, 27, for instance arranged at both ends of the machine.

The slots 2 are preferably very narrow so that the hot combustion gases have only a very limited cross-sectional area through which a possible escape may occur. To this end the width of the milled slots may be reduced to a minimum amount by chasing or swaging the material previous to finishing the valve to narrow the slots.

The present valve is particularly adapted for use as the member controlling the admission of scavenging air with high-speed two-stroke cycle internal combustion engines, because the movement of the valve occurs when the latter is nearly completely relieved of the pressure and as an effective cooling of the valve is obtained, whereas during the compression, combustion and expansion periods the flaps are pressed tight against their seats in the closed position of the valve. The valve may be built very light so that the forces for moving the valve may be kept small and large passage areas may be controlled by the valve.

The present valve may be designed as a longitudinally movable slide valve or as a rotary valve.

I claim:

1. In a two stroke cycle internal combustion engine a reciprocable sleeve-valve of smaller diameter than the piston of such engine arranged in the cylinder head for controlling the admission of scavenging air, resilient flaps at the lower end of said valve, integral therewith and obtained by slitting the lower end portion of the valve, a cylindrical facing in the cylinder head provided with closely arranged air inlet ports arranged around said facing, narrow bridge parts alternating with said ports to obtain a maximum port area, the lower portion of said valve controlling said ports, the resiliency of said flaps permitting them to be pressed against said facing to close said ports and means to reciprocate said valve during the scavening period and hold it stationary during all other periods.

2. In a two stroke cycle internal combustion engine a reciprocable sleeve-valve of smaller diameter than the piston of such engine, arranged in the cylinder head for controlling the admission of scavenging air, resilient flaps at the lower end of said valve, integral therewith, and obtained by slitting the lower end portion of the valve, the slits between said flaps being narrowed by swaging the longitudinal edges of the flaps, a cylindrical facing in the cylinder head, provided with closely arranged air inlet ports arranged around said facing, narrow bridge ports alternating with said ports to obtain a maximum port area, the lower portion of said valve controlling said ports, the resiliency of said flaps permitting them to be pressed against said facing to close said ports and means to reciprocate said valve during the scavenging period and hold it stationary during all other periods.

In testimony whereof I affix my signature.

HEINRICH SCHNEIDER.